W. T. ORR.
INDICATOR FOR ENGINES.
APPLICATION FILED MAR. 10, 1919.
1,408,393.
Patented Feb. 28, 1922.
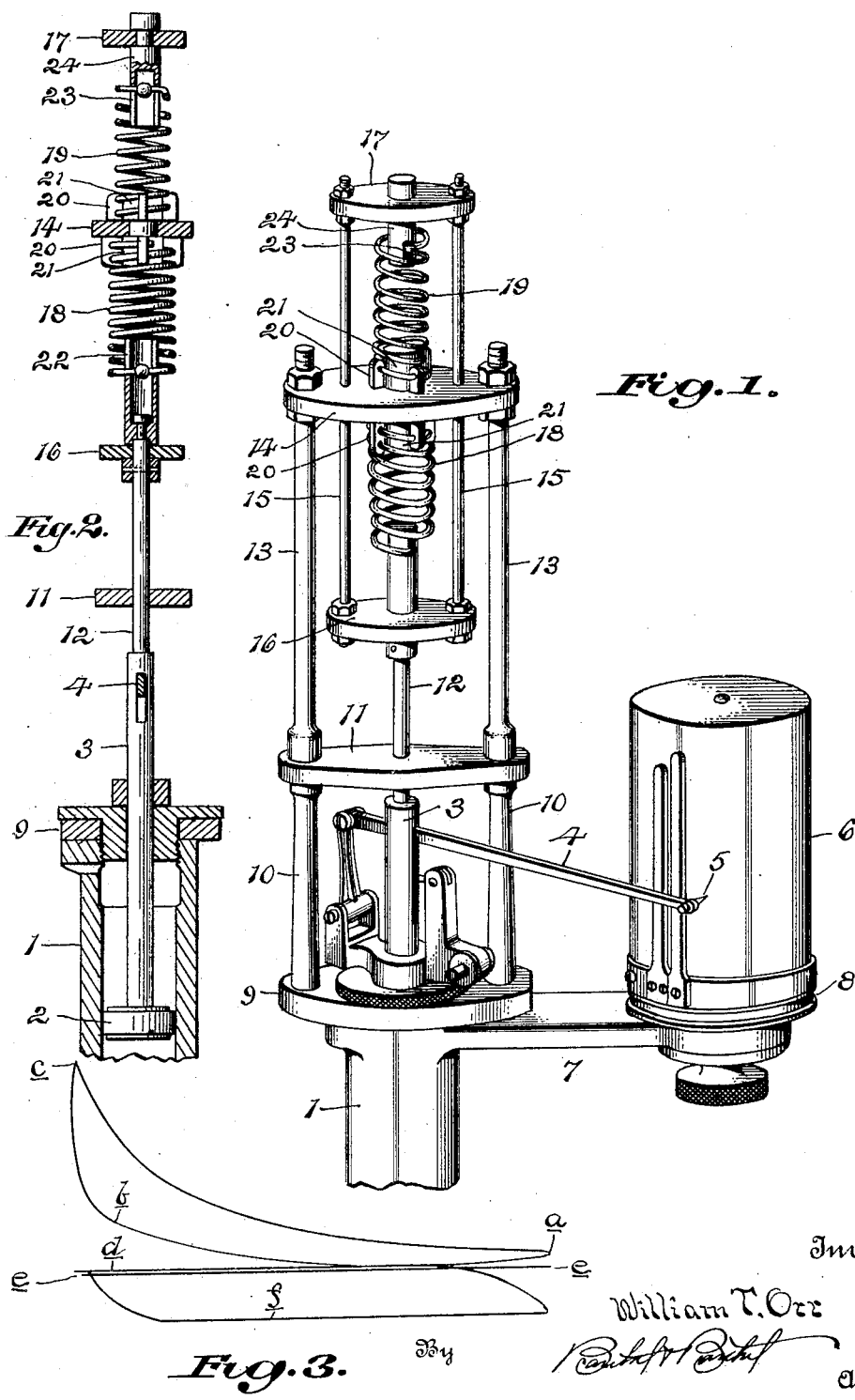

UNITED STATES PATENT OFFICE.

WILLIAM T. ORR, OF HIGHLAND PARK, MICHIGAN.

INDICATOR FOR ENGINES.

1,408,393.  Specification of Letters Patent.  Patented Feb. 28, 1922.

Application filed March 10, 1919. Serial No. 281,688.

*To all whom it may concern:*

Be it known that I, WILLIAM T. ORR, a citizen of the United States of America, residing at Highland Park, in the county of Wayne and State of Michigan, have invented certain new and useful Improvements in Indicators for Engines, of which the following is a specification, reference being had therein to the accompanying drawings.

This invention relates to an engine indicator and more particularly to a device for taking readings of the compression, power and suction strokes of a gas engine. Devices of this character are common for taking readings of the compression and power strokes of gas and other engines, but it is very desirable in making accurate calculations to be able to show in connection with such indicator cards, the suction or amount of vacuum produced in the cylinder of a four cycle internal combustion engine during the intake stroke of the piston. To this end the invention consists in providing a very simple device for the purpose, all as hereinafter more fully described and then claimed, reference being had to the accompanying drawing in which—

Figure 1 is a perspective view of a device illustrative of the invention;

Fig. 2 is a longitudinal vertical section through a portion of the same; and

Fig. 3 is a diagram of an indicating line made by the device in use.

As shown in the drawing a suitable chamber or cylinder 1 is arranged to be attached in any suitable manner to an engine cylinder with its lower end in direct communication with the interior of said cylinder therein, and in this cylinder above the piston therein, and in this cylinder is a piston 2 having a rod 3 extending through the upper end thereof. Operatively connected with this rod 3 is an indicator arm 4 pivotally supported at one end in such a manner that motion imparted thereto by the rod will cause a pencil point 5 carried by the opposite end of said arm to move in a vertical plane. In other words, vertical movement of the rod will impart a like vertical parallel movement to the pencil point to describe a straight vertical line upon a card placed upon the indicator drum 6 which is rotatably supported upon an arm 7 extending laterally from the cylinder 1. This drum is provided with a groove or sheave 8 for a cord (not shown) by means of which the drum may be turned in any suitable manner in timed relation to the movement of the engine piston of the cylinder to which the indicator is attached. The above described parts and their construction and arrangement is old and well known and forms no part of this invention, it being understood that the same is merely illustrative of a construction which may be employed but that any other suitable construction and arrangement of mechanism for the purpose may be used.

A suitable supporting plate or head 9 is secured in the usual manner upon the upper end of the cylinder 1 and provided with vertical posts 10 for a guide 11 secured to the upper ends of the posts in any suitable manner and having a guide opening for an extension 12 of the piston rod. The posts are extended upwardly by means of rigid extension rods 13 and these rods are connected at their upper ends by a second guide 14 having two guide openings therein for connecting rods 15 which are rigidly secured at one end to a cross-head 16 which in turn is secured in any suitable manner to the extension 12 of the piston rod 3. The upper ends of these rods 15 are connected by a cross-head 17 and coiled compression springs 18 and 19 are adjustably secured to the guide or cross-bar 14 at one end by threading the ends of the springs through openings provided therefor in lugs 20 on studs 21 secured to the cross-bar, or in any other suitable manner made fast to the cross-bar to be carried thereby and so that they may be adjusted to vary their resistance to compression.

The lower end of the spring 18 loosely engages the upper end of the piston rod extension 12, said rod being slotted inwardly from its upper end as at 22 to receive the lower cross-turn of the spring, and in a like manner, the upper end of the spring 19 loosely engages a slot 23 in the lower end of a stud 24 made fast to and extending downwardly from the upper cross-head 17.

It will thus be seen that upon explosion or compression of gases in the engine cylinder, the piston 2 in the cylinder 1 which is in direct communication with the interior of the engine cylinder above its piston, will be moved upwardly against the action of the spring 18 which will be compressed by consequent upward movement of the piston rod, and the indicator arm 4 will record this movement upon a card placed on the drum 6. By turning the drum back and forth in the usual manner in timed relation to the movements of the piston in the engine cylinder, curved lines will be drawn on the card as indicated in Fig. 3, the compression stroke being indicated by the portion of the line between *a* and *b*, the ignition period between *b* and *c*, and the power stroke between *c* and *a*. The exhaust stroke is indicated by the line *d* which is substantially parallel with and slightly above the line *e* which indicates atmospheric pressure.

This portion of the card may be made with any of the well known recording instruments for this purpose, but with an instrument of the present construction, when the engine piston starts down upon the intake stroke after completing the exhaust stroke, the vacuum created within the cylinder by such movement, or the amount of pull upon the indicator piston 2, due to such downward movement of the engine piston, will be indicated upon the card by the line *f* which quickly drops considerably below the line of atmospheric pressure and then quickly rises again as the piston starts up on the compression stroke, this inward movement of the indicator piston 2 which operates the indicator arm in making the line *f*, being permitted by the arrangement of crossheads and springs, the spring 19 being arranged to resist this inward or downward movement of the rod 3 so that the indicating line on the card may be accurately read, the resistance in pounds offered by the spring being known. This inward or suction movement is not affected by the spring 18 because of the loose connection of said spring at its lower end to the rod 12. In a like manner, the operation of the indicator to indicate compression and power, is not affected by the spring 19 because of the loose connection of the upper end of this spring to the cross-head 17.

By this arrangement of cross-heads carried by the indicator piston rod, and springs acting to resist motion of the rod in both directions and operating independently of each other, indicator cards may be made accurately showing all strokes of the engine piston, and such construction may be applied to any indicator of this type as commonly constructed.

Obviously, changes may be made in the construction or arrangement of parts without departing from the spirit of the invention and I do not therefore wish to limit myself to the construction shown.

What I claim is:—

1. In a device of the character described, the combination with a cylinder having means at one end only for connecting said cylinder to the cylinder head of an internal combustion engine, a piston in said cylinder operated in one direction by fluid forced into said cylinder and in the other direction by fluid exhausted therefrom, and indicating means operated by the movement in both directions of said piston, of means for yieldingly resisting the movement of said piston in one direction to regulate the operation of the indicating means for registering the force of compression of the fluid in said cylinder, and separate means for yieldingly resisting the movement of said piston in the other direction to regulate the operation of the indicating means for registering the force of exhaustion of fluid from said cylinder.

2. In a device of the character described, the combination with a cylinder adapted to be connected to the cylinder of an engine, a piston in said cylinder operated by compression and exhaustion of fluid in said cylinder caused by the operation of an engine piston, and indicating means operated by movements of said piston, of resistance means for regulating said indicating means when said piston is operated in one direction by compression of fluid in the cylinder, and separate resistance means for regulating said indicating means when said piston is operated in the opposite direction by exhaustion of fluid from said cylinder.

3. In a device of the character described, the combination with a cylinder, means for connecting said cylinder to the cylinder of an engine and affording free communication between said cylinders, a piston in said indicator cylinder, and indicating means operated by movements of said piston, of a spring for regulating said indicating means by resisting the movement of said piston in one direction, and a separate spring of different tension for regulating said indicating means by resisting the movement of said piston in an opposite direction.

4. In a device of the character described, the combination with a cylinder, means for connecting said cylinder to the cylinder of an engine and affording free communication between said cylinders, a piston in said indicator cylinder, an indicating means connected to said indicator piston to be operated by movements of said pitson, of a spring rigidly secured at one end and operatively connected at its opposite end to said piston for resisting the movement of said piston in one direction, and a separate spring rigidly secured at one end and operatively connected at its opposite end to said piston for resisting the movement of said piston in the other direction, said springs being compression springs of different resistance.

5. In a device of the character decribed, the combination with a cylinder adapted to be connected to the cylinder of an engine, a piston in said cylinder, and indicating means operated by movements of said piston, of a spring rigidly secured at one end and adapted to be loosely connected to said piston at its opposite end to resist movement of the piston in one direction, and a second spring rigidly secured at one end and loosely connected with said piston at its opposite end to resist movement of the piston in an opposite direction.

6. In a device of the character described, the combination with a cylinder adapted to be connected to the cylinder of an engine, a piston in said cylinder, and indicating means operated by movements of said piston, of a fixed support, springs of different resistances secured to said support at one end and extending in opposite directions therefrom, and means movable with said piston for engaging the unsecured ends of the springs.

7. In a device of the character described, the combination with a single cylinder, a single connection for said cylinder affording communication thereof with the cylinder of an engine, a single piston in said cylinder operated in one direction by compression of fluid in said cylinder and in the other direction by exhaustion of fluid therefrom, and indicating means operated by both movements of said piston, of a fixed support outside the cylinder, springs secured to said support at one end and extending in opposite directions therefrom, and means movable with said piston and adapted to engage and compress one spring upon movement of the piston in one direction and to engage and compress the other spring upon movement of the piston in the other direction.

8. In a device of the character described, the combination with a cylinder adapted to be connected to an engine cylinder, a piston in said cylinder, a piston rod for the piston and indicating means operated by the rod, of a fixed support outside the cylinder, and oppositely disposed springs carried by said support and arranged to alternately resist the movements of the rod in opposite directions.

9. In a device of the character described, the combination with a cylinder adapted to be connected to an engine cylinder, a piston in said cylinder, a piston rod for the piston extending outwardly through one end of the cylinder, and indicating means operated by the rod, of a fixed support adjacent the outwardly extending end of the rod, and oppositely disposed springs carried by said support and arranged to resist the movements of said rod, one for resisting the movement in one direction and the other for resisting said movement in an opposite direction.

10. In a device of the character described, the combination with a cylinder adapted to be connected to an engine cylinder, a piston in said cylinder, a piston rod for the piston, and indicating means operated by the rod, of a fixed support, a spring secured at one end to one side of said support, a spring of lesser resistance secured at one end to the other side of said support, and means on the piston rod for loosely engaging the free ends of said springs.

11. In a device of the character described, the combination with a cylinder adapted to be connected to an engine cylinder, a piston in said cylinder, a piston rod for the piston and indicating means operated by the rod, of a fixed support, a spring secured at one end to one side of said support, a second spring secured at one end to the other side of said support, cross-heads carried by the piston rod, and means on the cross-heads for loosely engaging the free ends of the springs.

In testimony whereof I affix my signature in the presence of two witnesses.

WILLIAM T. ORR.

Witnesses:
KARL H. BUTLER,
LEWIS E. FLANDERS.